(12) United States Patent
Chen et al.

(10) Patent No.: US 7,417,963 B2
(45) Date of Patent: Aug. 26, 2008

(54) RESOURCE CONTROL SYSTEM, RESOURCE CONTROL METHOD, AND BASE STATION AND MOBILE STATION SUITABLE FOR USE IN THE SAME

(75) Inventors: Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 956 days.

(21) Appl. No.: 10/321,531

(22) Filed: Dec. 18, 2002

(65) Prior Publication Data
US 2003/0117964 A1    Jun. 26, 2003

(30) Foreign Application Priority Data
Dec. 21, 2001  (JP)  ............... 2001-390489

(51) Int. Cl.
*G08C 17/00* (2006.01)
(52) U.S. Cl. .................. 370/311; 370/328; 455/63.1; 455/513
(58) Field of Classification Search ............ None
See application file for complete search history.

(56) References Cited

U.S. PATENT DOCUMENTS

| | | | |
|---|---|---|---|
| 6,167,237 A * | 12/2000 | Rapeli ............ 455/63.1 |
| 6,169,898 B1 | 1/2001 | Hsu et al. |
| 6,198,928 B1 | 3/2001 | Keurulainen et al. |
| 6,353,729 B1 | 3/2002 | Bassirat |
| 6,463,294 B1 * | 10/2002 | Holma et al. ........... 455/513 |
| 6,741,564 B2 * | 5/2004 | Luddy ............. 370/232 |
| 6,801,515 B1 * | 10/2004 | Ishikawa et al. ........ 370/342 |
| 6,834,193 B1 * | 12/2004 | Linderborg et al. ...... 455/450 |
| 7,006,828 B1 * | 2/2006 | Czaja et al. ........... 455/442 |
| 7,031,712 B2 * | 4/2006 | Takano et al. .......... 455/442 |

(Continued)

FOREIGN PATENT DOCUMENTS

EP         1 176 738         1/2002

(Continued)

*Primary Examiner*—Wing F. Chan
*Assistant Examiner*—Michael J Moore, Jr.
(74) *Attorney, Agent, or Firm*—Oblon, Spivak, McClelland, Maier, Neustadt, P.C.

(57) ABSTRACT

An object of the present invention is to enable the improvement of Qos and efficient use of resources with regard to the entire system by performing resource control of an own cell in cooperation with that of peripheral cells. The present invention provides a resource control system used for packet communication between a mobile station and each of a first and a second base stations. The first base station includes the judgment unit for judging whether or not the Qos of a packet to be communicated with the mobile station is ensured in the packet communication with the mobile station, or judging whether or not the resources necessary for a packet to be communicated with the mobile station are secured; and the second base station interface for requesting the second base station to suppress the use of resources when the Qos is judged not to be ensured, or the necessary resources are judged not to be secured. The second base station includes a resource use suppression unit, which suppresses the use of resources for the packet communication with the mobile station in accordance with the request from the first base station.

23 Claims, 12 Drawing Sheets

U.S. PATENT DOCUMENTS

| | | | |
|---|---|---|---|
| 7,130,635 B2 * | 10/2006 | Cerwall et al. | 455/450 |
| 2001/0053695 A1 | 12/2001 | Wallentin | |
| 2003/0134655 A1 * | 7/2003 | Chen et al. | 455/522 |
| 2005/0048963 A1 * | 3/2005 | Kubler et al. | 455/423 |

FOREIGN PATENT DOCUMENTS

| | | |
|---|---|---|
| EP | 1 182 902 | 2/2002 |
| JP | 8-107382 | 4/1996 |
| JP | 10-511237 | 10/1998 |
| WO | WO 98/38821 | 9/1998 |
| WO | WO 99/02004 | 1/1999 |
| WO | WO 00/14900 | 3/2000 |
| WO | WO 00/22694 | 4/2000 |
| WO | WO 01/41376 A2 | 6/2001 |

* cited by examiner

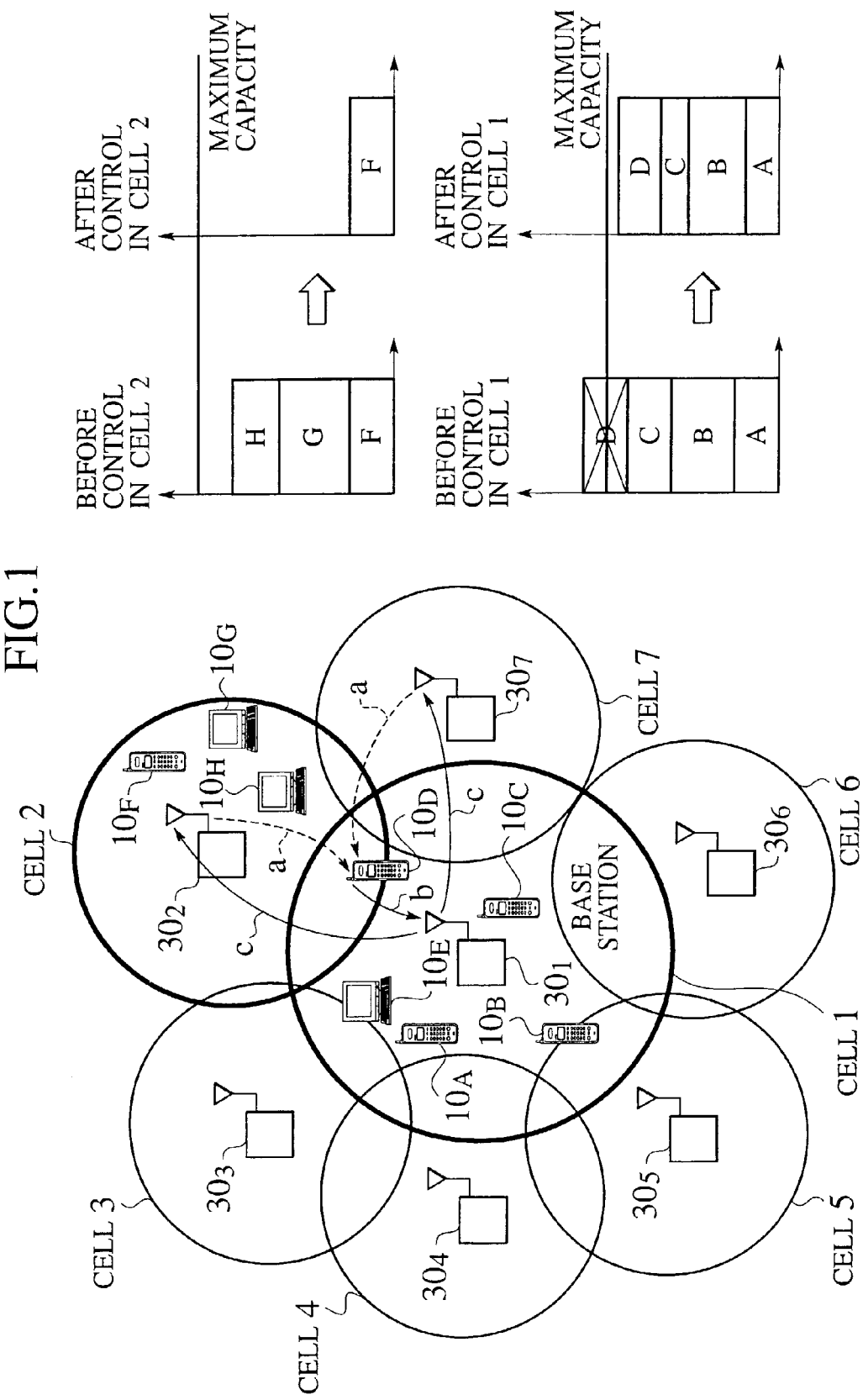

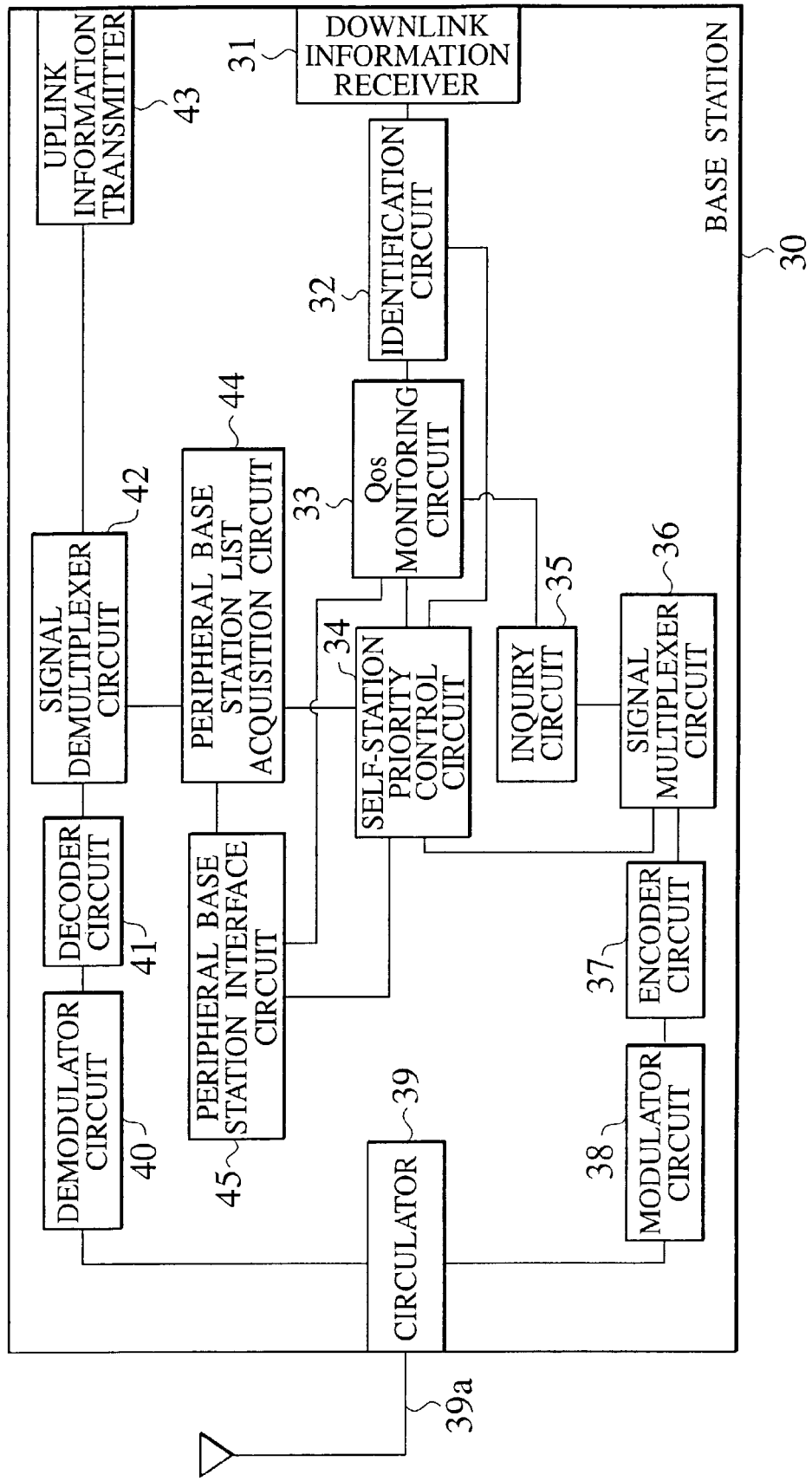

FIG.3

| TRAFFIC TYPE | EF (EXPEDITED FORWARDING) | AF (ASSURED FORWARDING) | BE (BEST EFFORT) |
|---|---|---|---|
| DSCP | 101110 | XXXYY0 | 000000 |
| PRIORITY | HIGHEST PRIORITY CLASS OF HIGHEST QUALITY | HIGHEST PRIORITY CLASS NEXT TO EF | BEST EFFORT COMMON TO Diffserv NON-SUPPORTING ROUTER |
| REAL TIME, NON-REAL TIME | REAL TIME | AF4 : REAL TIME<br>AF3〜AF1 : NON-REAL TIME | NON-REAL TIME |
| QoS REQUIREMENT (ALLOWABLE DELAY TIME) | 100ms | AF4 : 200ms<br>AF3〜AF1 : NONE | NONE |

FIG.4

|  | CLASS 1 | CLASS 2 | CLASS 3 | CLASS 4 |
|---|---|---|---|---|
| LEVEL 1 (DISCARD PRIORITY LOW) | 001010 | 010010 | 011010 | 100010 |
| LEVEL 2 (DISCARD PRIORITY MEDIUM) | 001100 | 010100 | 011100 | 100100 |
| LEVEL 3 (DISCARD PRIORITY HIGH) | 001110 | 010110 | 011110 | 100110 |

FIG.5

| RATIO OF USERS WITH UNSATISFIED Qos | NUMBER OF CELLS TRANSMITTING RESOURCE ALLOCATION CONTROL REQUEST AND URGENCY | RESOURCE ALLOCATION CONTROL IN PERIPHERAL CELL (TEMPORAL STOP OF TRANSMISSION) |
|---|---|---|
| 1/3 OR LESS | 1, LOW | NON-REAL TIME (BE) |
| 1/3 ~ 2/3 | 2, MEDIUM | NON-REAL TIME (BE, AF1, AF2, AF3) |
| 2/3 OR MORE | 3, HIGH | NON-REAL TIME AND REAL TIME WITH A MARGIN (BE, AF1, AF2, AF3, AF4) |

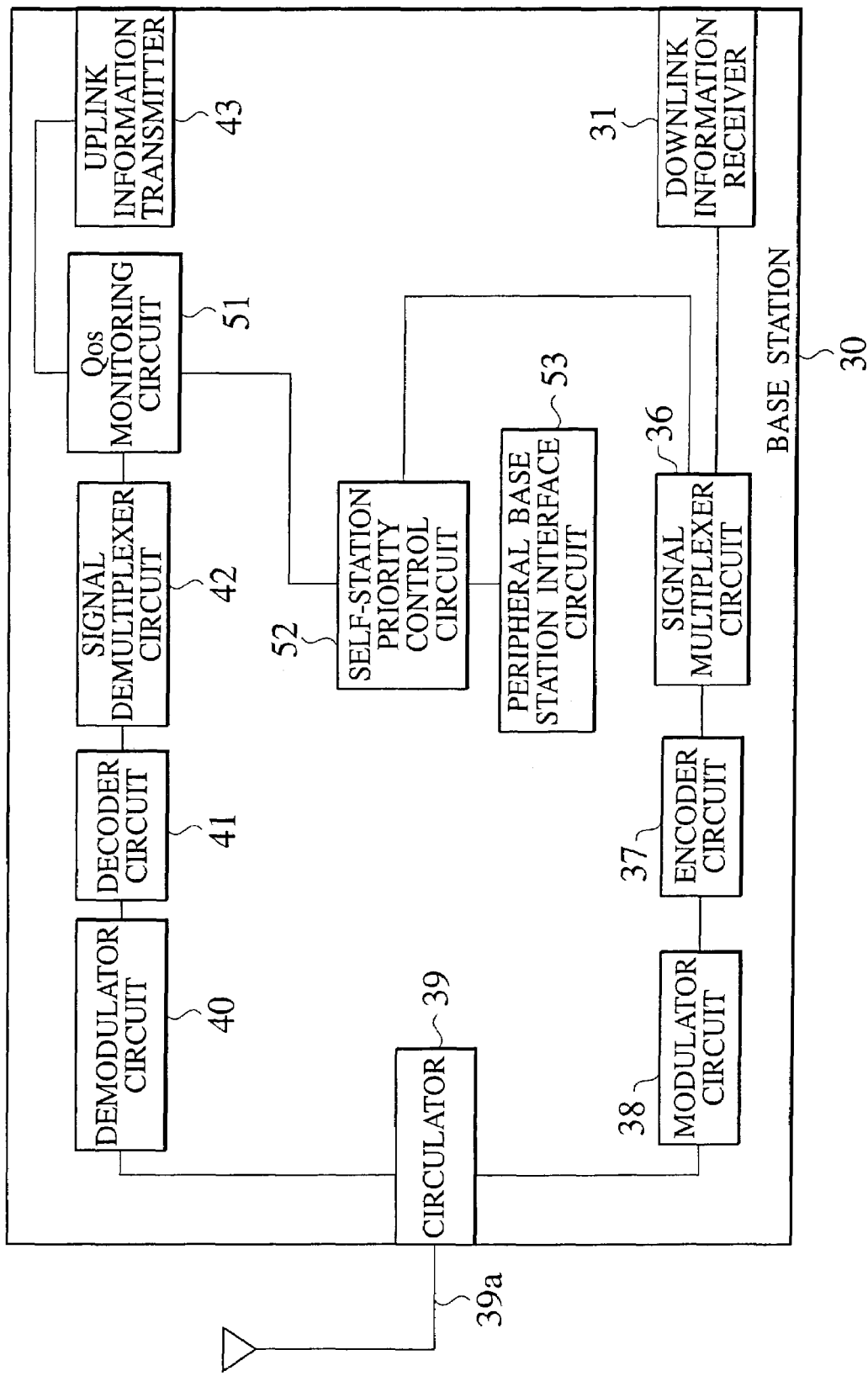

FIG.10

| RATIO OF USERS WITH INSUFFICIENT ALLOCATED RESOURCE OR USERS WITH UNSATISFIED Qos | NUMBER OF CELLS TRANSMITTING RESOURCE ALLOCATION CONTROL REQUEST AND URGENCY | RESOURCE ALLOCATION CONTROL IN PERIPHERAL CELL (ALLOCATION POSTPONEMENT, RATE REDUCTION, INCREASE IN MEAN TRANSMISSION INTERVAL) |
|---|---|---|
| 1/3 OR LESS | 1, LOW | NON-REAL TIME (BE) |
| 1/3 ~ 2/3 | 2, MEDIUM | NON-REAL TIME (BE, AF1, AF2, AF3) |
| 2/3 OR MORE | 3, HIGH | NON-REAL TIME AND REAL TIME WITH A MARGIN (BE, AF1, AF2, AF3, AF4) |

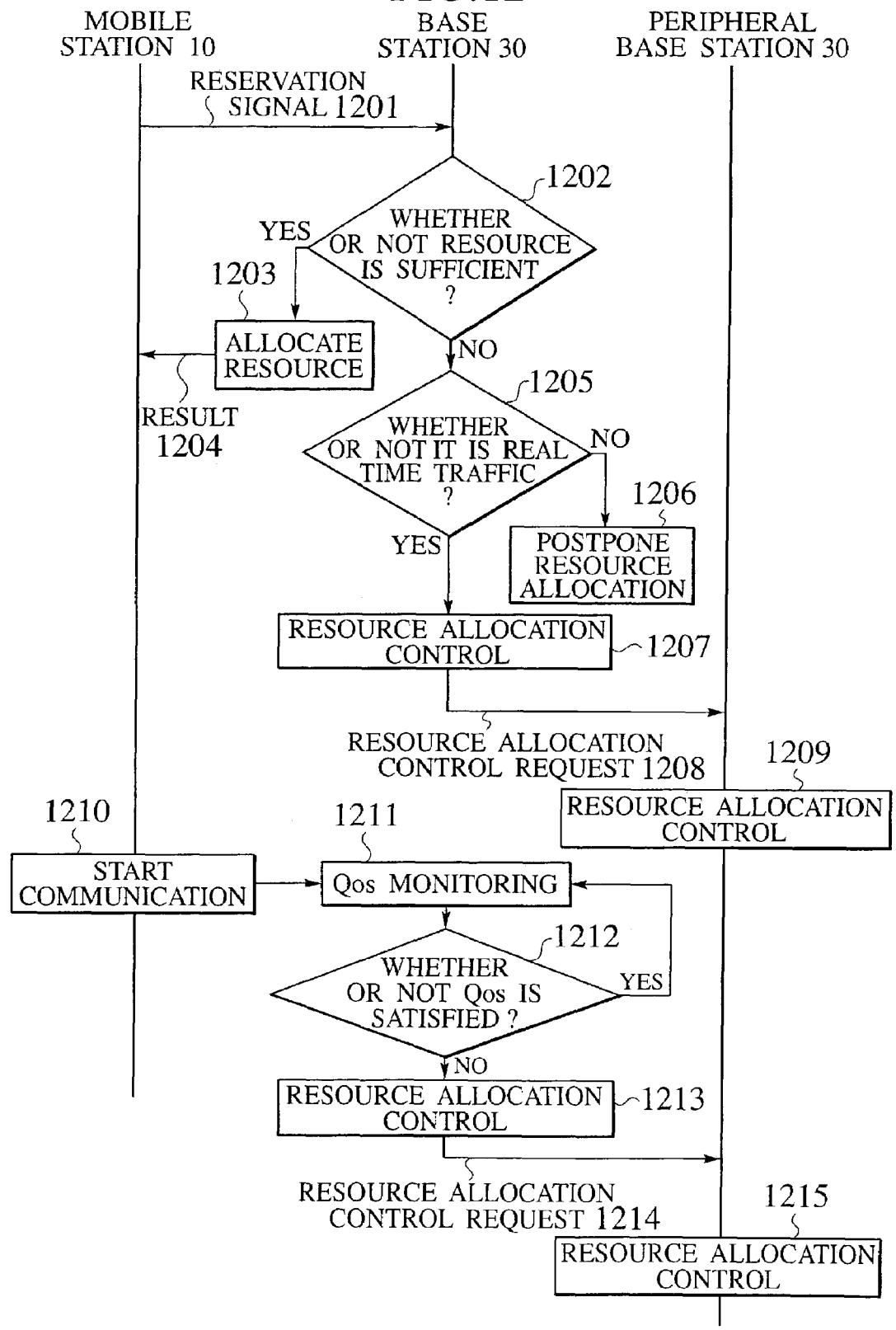

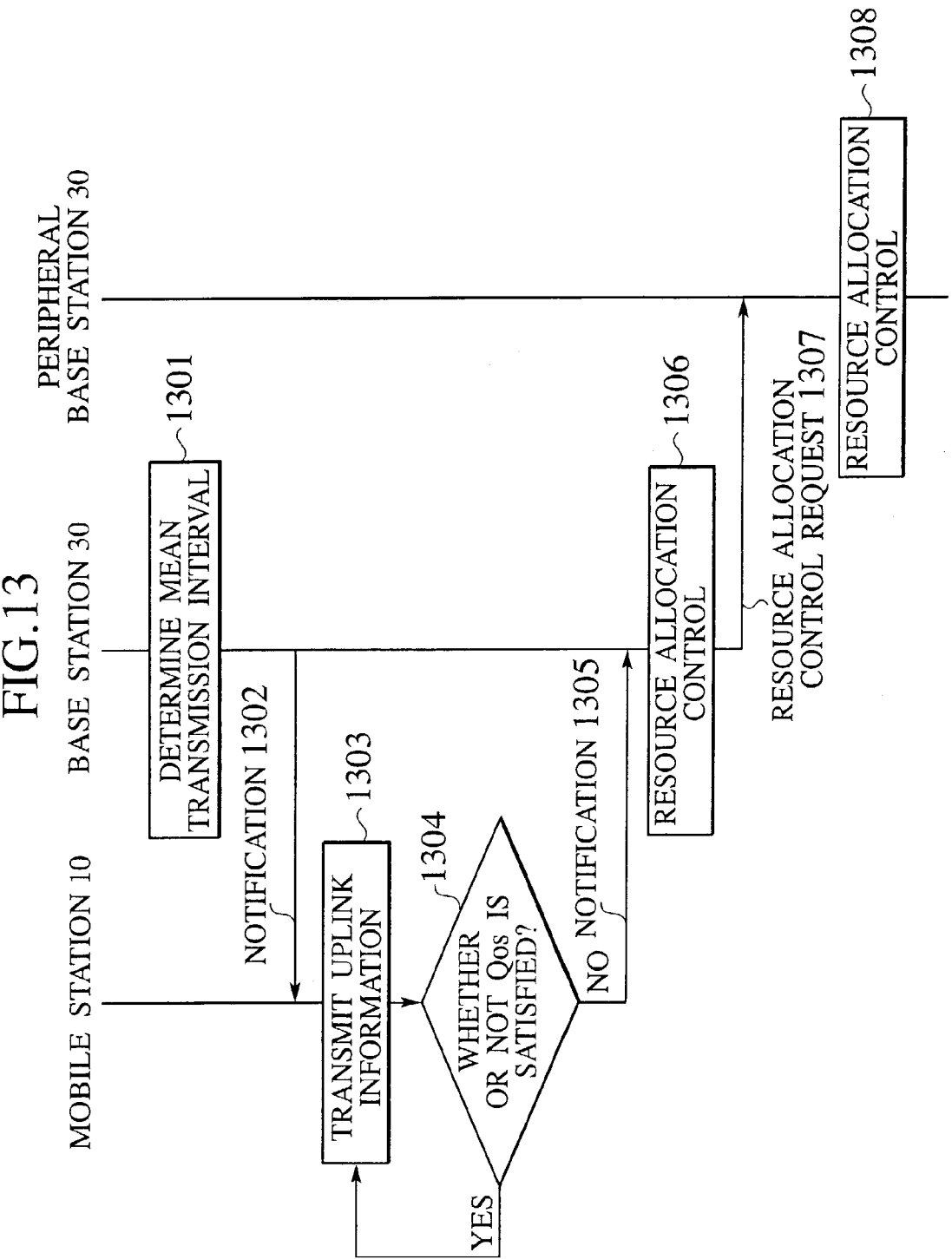

US 7,417,963 B2

RESOURCE CONTROL SYSTEM, RESOURCE CONTROL METHOD, AND BASE STATION AND MOBILE STATION SUITABLE FOR USE IN THE SAME

CROSS REFERENCE TO RELATED APPLICATIONS

This application is based upon and claims the benefit of priority from the prior Japanese Patent Application No. P2001-390489, filed on 21 Dec. 2001; the entire contents of which are incorporated herein by reference.

BACKGROUND OF THE INVENTION

1. Field of the Invention

The present invention relates to a resource control system and a resource control method for packet mobile communication and relates to a base station and a mobile station suitable for use in the same.

2. Description of the Related Art

In packet mobile communication using CDMA (Code Division Multiple Access), a capacity of an uplink radio channel is determined based on maximum allowed receiving power of a base station, and a capacity of a downlink radio channel is determined based on a maximum transmission power of the base station. In the packet mobile communication using CDMA, when transmission power control (TPC) is carried out, the received power (uplink direction) of the base station or the transmission power (downlink direction) of the base station is determined in accordance with an amount of interference received by the base station or the mobile station.

However, in the conventional packet mobile communication as described above, as the amount of interference received by the base station or the mobile station increases, the possibility increases that the total received power (uplink direction) of the base station exceeds the maximum allowed receiving power thereof and the total transmission power (downlink direction) of the base station exceeds the maximum transmission power thereof.

Therefore, there is a problem in that packet transmission fails or packet transmission becomes impossible between the base station and the mobile station, and packet discard or packet transmission delay is caused.

In order to solve such a problem, in conventional packet mobile communication, a technique performing Qos (Quality of Service) control has been known.

In a packet mobile communication performing the conventional Qos control, the base station individually performs resource control, like allocating resource to high priority users, in accordance with the amount of interference, the amount of resources (radio carrier frequency, time slot, code, etc) of an own cell, and the traffic priority of users in its own cell.

However, in the packet mobile communication performing the conventional Qos control, since the base station or mobile station performs the resource control individually in accordance only with the amount of interference from other cells, the amount of resources of the own cell, and the traffic priority of the own cell, the resource control is not intended to perform in cooperation with the resource control of other cells.

Therefore, there is a problem in that the Qos cannot be improved and the resources cannot be efficiently utilized from the point of view of the whole packet mobile communication system.

For example, as shown in FIG. 1, when real time users A to D are concentrated in a cell 1 and non-real time users G and H are concentrated in a cell 2 adjacent to the cell 1, in a case where downlink traffic in the cell 1 is in a state of congestion, each of mobile stations $10_A$ to $10_E$ receives a large amount of interference. Accordingly, each of mobile stations $10_A$ to $10_E$ requests transmission power (downlink direction) at high level to the base station $30_1$.

As a result, even when the base station $30_1$ of the cell 1 preferentially allocates available resources to the real time users (for example, the users A to C) as done by conventional Qos, the base station $30_1$ cannot transmit packets directed to some real time users (for example, the user D). Therefore, in the cell 1, packet discard occurs because a delay time of packet transmission exceeds an allowable delay time thereof in some cases.

On the other hand, in the adjacent cell 2, since the number of real time users (for example, the user F) is small, the base station $30_2$ of the cell 2 has enough margin in the allocatable resources even after transmitting the packets to the real time user F in the own cell. Accordingly, the base station $30_2$ can transmit the packets (non-real time packets) directed to the users G and H up to the maximum transmission power of the base station $30_2$.

As described above, in the case where real time packets cannot be transmitted in the cell 1 while even non-real time packets can be transmitted after real time packets are transmitted in the cell 2, there is a problem of lowering satisfaction of the Qos and the resource utilization efficiency with regard to the entire service area in the packet mobile communication system.

Especially, in a micro cell with a small cell diameter and a cell for fourth generation mobile communications, the mobile stations are often unevenly distributed in each service area, and the above described problem becomes marked.

BRIEF SUMMARY OF THE INVENTION

The present invention was made in the light of the above described problems. The object of the present invention is to provide a resource control system and a resource control method enabling the improvement of Qos and effective use of resources with regard to an entire packet mobile communication system, by performing resource control of an own cell in cooperation with resource control of peripheral cells, and to provide a base station and a mobile station suitable for use in the same.

Specifically, the object of the present invention is to provide a resource control system and a resource control method enabling the improvement of Qos satisfaction and system capacity, and provide a base station and a mobile station suitable for use in the same in the following manner.

The base station of a specific cell temporarily suppresses the use of resources for non-real time packets, packets of low priority, or real time packets having a margin for Qos by the base stations of a peripheral cells, which are prone to affect the base station of the specific cell with interference.

Therefore, in the above described specific cell, the interference from peripheral cells is reduced, and packet discard caused by exceeding an allowable delay time of the transmission of the real time packet or packet discard caused by transmission failure of the real time packet is reduced.

A first aspect of the present invention is summarized as a resource control system in a packet mobile communication environment including a first base station, a second base station, and a mobile station, and the resource control system controls resources used for packet communication between the mobile station and each of the first base station and the second base station. The first base station includes a judgment unit and a second base station interface. The judgment unit judges whether or not the Qos of a packet to be communicated between the first base station and the mobile station is ensured, or judges whether or not the resources necessary for a packet to be communicated between the first base station and the mobile station are secured. The second base station interface requests the second base station to suppress the use of resources when the Qos of the packet is judged not to be ensured or when the resources necessary for packet are judged not to be secured. The second base station includes a resource use suppression unit for suppressing the use of resources for the packet communication between the mobile station and the second base station in accordance with the request from the first base station.

In the first aspect of the present invention, preferably, the first base station includes a second base station information request unit for requesting the mobile station for information regarding the second base station when the Qos of the packet is judged not to be ensured or when the resources necessary for the packet are judged not to be secured, the second base station interface requests the second base station to suppress the use of resources in accordance with received information regarding the second base station, and the mobile station includes a second base station information transmitter for transmitting information regarding the second base station of a high interference level to the first base station in accordance with the request from the first base station.

In the first aspect of the present invention, preferably, the judgment unit judges whether or not the Qos of the packet is ensured by recognizing a traffic type of a packet to be communicated between the first base station and the mobile station and comparing a certain threshold predetermined for each traffic type with the Qos of the packet.

In the first aspect of the present invention, preferably, the judgment unit recognizes the traffic type of the packet by DSCP.

In the first aspect of the present invention, preferably, the mobile station includes an uplink packet judgment unit and a notification unit. The uplink packet judgment unit judges whether or not the Qos of an uplink packet is ensured by recognizing the traffic type of the uplink packet directed to the first base station and comparing a certain threshold predetermined for each traffic type with the Qos of the packet. The notification unit notifies the first base station that the Qos of the uplink packet is not ensured when the Qos of the uplink packet is judged not to be ensured. Moreover, preferably, the second base station interface of the first base station requests the second base station to suppress the use of resources in accordance with the notification received from the mobile station.

In the first aspect of the present invention, preferably, as the Qos of the packet, at least one of a buffer residence time, a delay jitter, an error rate, and a transmission rate of the packet is used.

In the first aspect of the present invention, preferably, the second base station interface requests the second base station to release the suppression of use of resources when the second base station interface detects that the Qos of the packet is ensured, and the second base station includes a resource use suppression release unit. The resource use suppression release unit releases the suppression of use of resources for packet communication between the mobile station and the second base station in accordance with the request for release from the first base station.

A second aspect of the present invention is summarized as a first base station in a packet mobile communication environment including the first base station, a second base station, and a mobile station, and the first base station is used in a resource control system for controlling resources used for packet communication between the mobile station and each of the first base station and the second base station. The first base station includes a judgment unit, and a second base station interface. The judgment unit judges whether or not the Qos of a packet to be communicated between the first base station and the mobile station is ensured or whether or not the resources necessary for a packet to be communicated between the first base station and the mobile station are secured. The second base station interface requests the second base station to suppress the use of resources when the Qos of the packet is judged not to be ensured or when the resources necessary for the packet are judged not to be secured.

A third aspect of the present invention is summarized as a second base station in a packet mobile communication environment including a first base station, the second base station, and a mobile station, and the second base station is used in a resource control system for controlling resources used for packet communication between the mobile station and each of the first base station and the second base station. The second base station includes a resource use suppression unit for suppressing the use of resources for packet communication between the second base station and the mobile station in accordance with a request from the first base station to suppress the use of resources, when Qos of a packet to be communicated between the first station and the mobile station is judged not to be ensured or when the resources necessary for a packet to be communicated between the first station and the mobile station are judged not to be secured.

A fourth aspect of the present invention is summarized as a mobile station in a packet mobile communication environment including a first base station, a second base station, and the mobile station, and the mobile station is used in a resource control system for controlling resources used for packet communication between the mobile station and each of the first base station and the second base station. The mobile station includes a second base station information transmitter for transmitting information regarding the second base station of a high interference level to the first base station.

A fifth aspect of the present invention is summarized as a method of controlling resources in a packet mobile communication environment including a first base station, a second base station, and a mobile station, and the method is used for packet communication between the mobile station and each of the first base station and the second base station. The method includes steps A to C. In the step A, it is judged in the first base station whether or not the Qos of a packet to be communicated between the first base station and the mobile station is ensured or whether or not the resources necessary for a packet to be communicated between the first base station and the mobile station are secured. In the step B, the second base station is requested to suppress the use of resources when the Qos of the packet is judged not to be ensured or when the resources necessary for the packet are judged not to be secured in the first base station. In the step C, the use of resources for the packet communication between the second base station and the mobile station is suppressed in the second base station in accordance with the request from the first base station.

BRIEF DESCRIPTION OF THE SEVERAL VIEWS OF THE DRAWINGS

FIG. 1 is a view showing an entire constitution of a resource control system according to an embodiment of the present invention.

FIG. 2 is a functional block diagram of a base station according to the embodiment of the present invention.

FIG. 3 is a table showing traffic types according to the embodiment of the present invention.

FIG. 4 is a table showing traffic types according to the embodiment of the present invention.

FIG. 5 is a table showing a resource allocation control request according to the embodiment of the present invention.

FIG. 9 is a functional block diagram of a base station according to another embodiment of the present invention.

FIG. 10 is a table showing a resource allocation control request according to the embodiment of the present invention.

FIG. 12 is a time chart showing an operation of the resource control system according to the embodiment of the present invention.

FIG. 13 is a time chart showing the operation of the resource control system according to the embodiment of the present invention.

Figure 6:
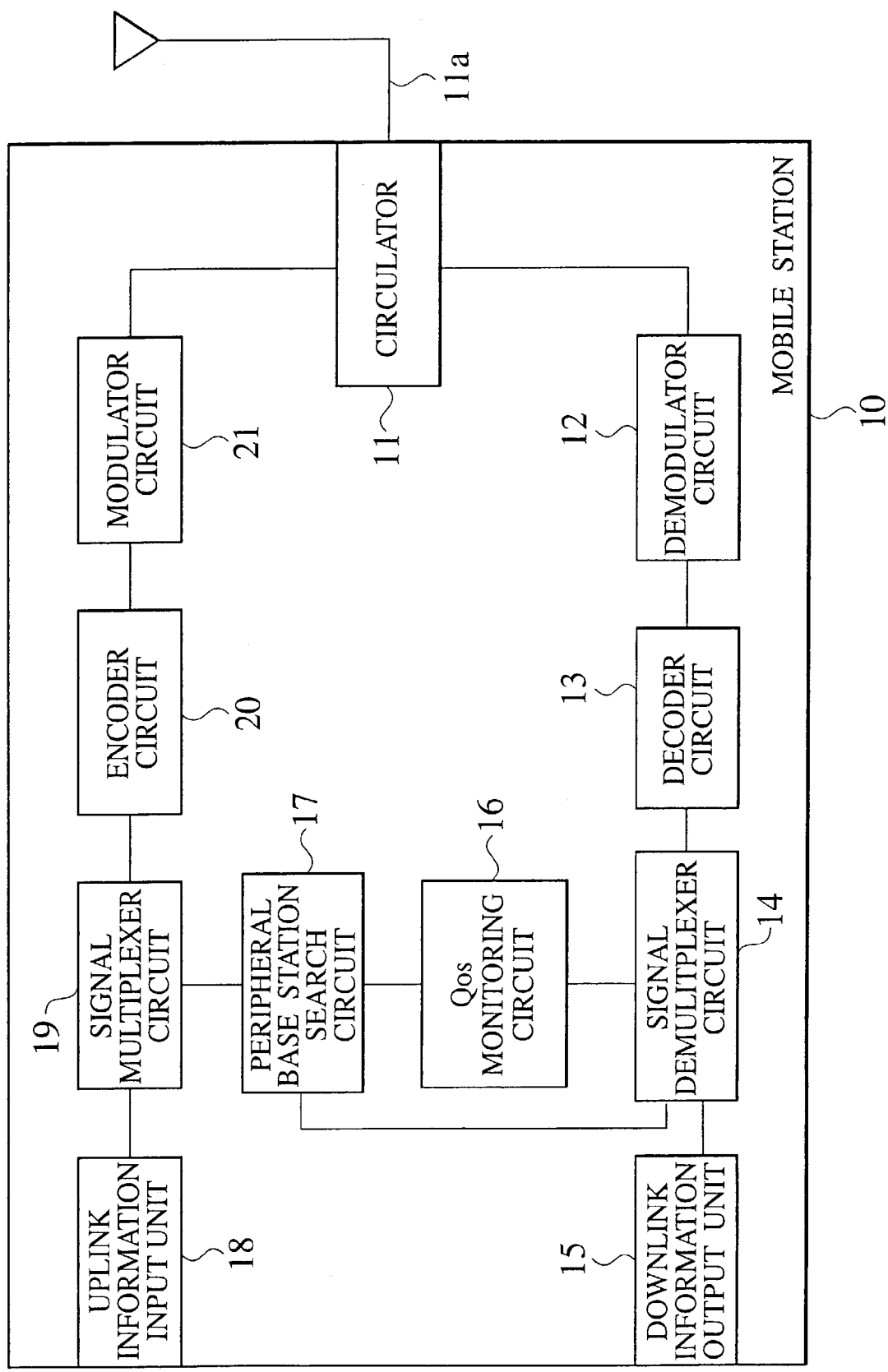
FIG. 6 is a functional block diagram of a mobile station according to the embodiment of the present invention.

DETAILED DESCRIPTION OF THE INVENTION (Constitution of Resource Control System According to Embodiment 1)

A description will be made for a constitution of a resource control system according to an embodiment 1 of the present invention with reference to the drawings. FIG. 1 is a view showing an entire constitution of the resource control system according to this embodiment.

The resource control system according to the embodiment is intended to perform "control of downlink resources (radio channels)". As shown in FIG. 1, the resource control system includes a plurality of base stations $30_1$ to $30_7$ provided in each of a plurality of cells 1 to 7 and a plurality of mobile stations $10_A$ to $10_H$ located in the cells 1 to 7. The mobile stations $10_A$ to $10_H$ establish radio links with the base stations $30_1$ to $30_7$ of the respective cells 1 to 7.

As shown in FIG. 1, in a packet mobile communication environment provided with a first base station $30_1$, a second base station $30_2$, and a mobile station $10_D$, the resource control system according to this embodiment controls resources (radio channels) used in packet communication between the mobile station $10_D$ and each of the first base station $30_1$ and a second base station $30_2$.

In FIG. 1, real time users A to D respectively using the mobile stations $10_A$ to $10_D$ and a non-real time user E using the mobile station $10_E$ are located in the cell 1. A real time user F using the mobile station $10_F$ and non-real time users G and H respectively using the mobile stations $10_G$ and $10_H$ are located in the cell 2. Here, the mobile stations $10_A$ to $10_D$ and $10_F$ are terminals for real time communication such as voice call, and the mobile stations $10_E$, $10_G$, and $10_H$ are terminals for non-real time communication such as data call.

In the resource control system according to this embodiment, as shown in FIG. 1, when the base station $30_1$ simultaneously transmits packets (real time packets) directed to the real time users A to D at a certain timing, the transmission power of the base station $30_1$ of the cell 1 exceeds the maximum transmission power of the base station $30_1$. Accordingly, allocatable resources run short, and the base station $30_1$ cannot transmit packets directed to the real time user D.

However, if the base station $30_2$ of the cell 2 receives a request for suppressing the use of resources (resource allocation control request), the base station $30_2$ temporarily stops the transmission of the packets (non-real time packets) directed to the non-real time users G and H. Therefore, an effect of interference from the cell 2 to the cell 1 is reduced, and the transmission power of the base station $30_1$ of the cell 1 directed to the real time users A to D is reduced. Therefore, the base station $30_1$ of the cell 1 is allowed to transmit the packets directed to the real time user D.

FIG. 2 shows a functional block diagram of each base station 30. The base station 30 includes a downlink information receiver 31, an identification circuit 32, a Qos monitoring circuit 33, a self-station priority control circuit 34, an inquiry circuit 35, a signal multiplexer circuit 36, an encoder circuit 37, a modulator circuit 38, a circulator 39, a radio antenna $39_a$, a demodulator circuit 40, a decoder circuit 41, a signal demultiplexer circuit 42, an uplink information transmitter 43, a peripheral base station list acquisition circuit 44, and a peripheral base station interface circuit 45.

In this embodiment, the identification circuit 32 and the Qos monitoring circuit 33 constitute a judgment unit, which judges whether or not the Qos of the packets communicated between the base station 30 and each mobile station 10 is ensured, or judges whether or not resources necessary for the packets communicated between the base station 30 and the mobile station 10 are secured.

The peripheral base station interface circuit 45 constitutes a second base station interface, which requests each second base station (peripheral base station 30) to suppress the use of resources when the Qos of the packet is judged not to be ensured and when the resources necessary for the packet are judged not to be secured.

The self-station priority control circuit 34 constitutes a resource use suppression unit and a resource use suppression release unit. The resource use suppression unit suppresses the use of resources for packet communication with the mobile station 10 in accordance with the request from the first base station (peripheral base station 30). The resource use suppression release unit releases the suppression of use of resources for packet communication with the mobile station 10 in accordance with a request for release from the first base station (peripheral base station 30).

The downlink information receiver 31 is connected to the identification circuit 32. The downlink information receiver 31 receives a downlink packet (downlink information) from an upper network (an exchange, a radio network controller, etc.) and forwards the received downlink packet to the identification circuit 32.

The identification circuit 32 is connected to the downlink information receiver 31, the Qos monitoring circuit 33, and the self-station priority control circuit 34. The identification circuit 32 identifies a traffic type of a downlink packet received from the downlink information receiver 31 and a Qos request associated with the traffic type.

The identification circuit 32 transmits the downlink packet received from the downlink information receiver 31 and the identified traffic type to the self-station priority control circuit 34, and transmits the identified Qos requirement to the Qos monitoring circuit 33.

In this embodiment, the traffic type of the packet is identified with "Diffserv Code Point (DSCP)". Diffserv is a Qos control method via the Internet, which has become almost a standard implementation for a router in an IP network. A header field of an IP packet has a "Diffserv field", and six bits thereof indicate the "DSCP" of the packet.

However, the present invention is not limited to this Qos control method. The traffic type of the packet may be determined by a method of declaring the traffic type at the time of reservation of radio resources or other methods.

Using FIGS. 3 and 4, descriptions will be made of the traffic types of the packet and the Qos requirement used in this embodiment.

As the traffic types of the packet used in this embodiment, as shown in FIG. 3, three types are defined as follows: "Expedited Forwarding (EF) type", "Assured Forwarding (AF) type", and "Best Effort (BE) type". As shown in FIG. 4, the "AF type" falls into four classes (classes 1 to 4) depending on priority (packet transmission rate, buffer length, etc.). Each of the four classes falls into three levels (levels 1 to 3) depending on discard priority.

The "DSCP" of the "EF type" packet is "101110", the "DSCP" of the "AF type" packet is "XXXYY0", and the "DSCP" of the "BE type" packet is "000000".

The "DSCP" of the "AF type/class 1/level 1" is "001010". The "DSCP" of the "AF type/class 1/level 2" is "001100". The "DSCP" of the "AF type/class 1/level 3" is "001110".

The "DSCP" of the "AF type/class 2/level 1" is "010010". The "DSCP" of the "AF type/class 2/level 2" is "010100". The "DSCP" of the "AF type/class 2/level 3" is "010110".

The "DSCP" of the "AF type/class 3/level 1" is "011010". The "DSCP" of the "AF type/class 3/level 2" is "011100". The "DSCP" of the "AF type/class 3/level 3" is "011110".

The "DSCP" of the "AF type/class 4/level 1" is "100010". The "DSCP" of the "AF type/class 4/level 2" is 100100". The "DSCP" of the "AF type/class 4/level 3" is "100110".

The "EF type" defines a packet of highest quality in a highest priority class. The "AF type" defines a packet in a next highest priority class. The "BE type" defines a packet of a best effort type.

Hereinafter, "AF type/class 1/levels 1 to 3" are generally referred to as "AF1 type"; "AF type/class 2/levels 1 to 3" are generally referred to as "AF2 type"; "AF type/class 3/levels 1 to 3" are generally referred to as "AF3 type"; and "AF type/class 4/levels 1 to 3" are generally referred to as "AF4 type".

In this embodiment, the "EF type" and "AF4 type" packets are defined as "real time type" packets (real time packets)". The packets of the other traffic types are defined as "non-real time type" packets (non-real time packets).

Moreover, in this embodiment, the "Qos requirement" indicating an allowable transmission delay time is set to "100 ms" for the "EF type" packet and "200 ms" for the "AF type" packet". The "Qos requirement" is not set for the other packets.

In this embodiment, one "DSCP" is associated with one "traffic type". However, one "DSCP" may be associated with a plurality of "traffic types" depending on desire of the user.

For example, in a case where video image quality of a videophone can take three ranks, "high", "medium" and "low", the respective ranks are associated with the "AF4 type", "AF3 type" and "AF2 type". The user can be previously notified of the existence of the image quality of the above described three ranks and select the image quality. Here, when the selection is made by the user, the "DCSP" is associated with the "traffic type" of the packet in accordance with the selection. When the selection is not made by the user, for example, the "DCSP" is associated with the "AF4 type" by default.

The Qos monitoring circuit 33 is connected to the identification circuit 32, the self-station priority control circuit 34, the inquiry circuit 35, and the peripheral base station interface circuit 45. The Qos monitoring circuit 33 monitors the "Qos (buffer residence time in this embodiment)" of the downlink packet in a packet transmission buffer (packet transmission queue) of the self-station priority control circuit 34, and judges whether or not the Qos of the downlink packet is ensured.

The Qos monitoring circuit 33 may monitor the Qos of the downlink packets of only the predetermined traffic type (for example, real time packets or high priority packets). Moreover, the Qos monitoring circuit 33 may obtain a ratio of the downlink packets with the unsatisfied Qos to the all of the downlink packets. The Qos monitoring circuit 33 may monitor a delay jitter, an error rate (PER), or a transmission rate of the downlink packet.

Specifically, when the buffer residence time of the downlink packet exceeds a predetermined threshold (value of "Qos requirement (allowed delay time)" in FIG. 3), the Qos monitoring circuit 33 judges that the Qos of the downlink packet is not ensured, and then notifies the self-station priority control circuit 34 that the Qos of the downlink packet is not ensured.

Also thereafter, when the buffer residence time of the downlink packet exceeds a predetermined threshold (a value of "Qos requirement (allowed delay time)" in FIG. 3), the Qos monitoring circuit 33 notifies the inquiry circuit 35 that the buffer residence time exceeds the predetermined threshold.

Here, the Qos monitoring circuit 33 determines the above described buffer residence time of the downlink packet from a time when the downlink packet is stored in the predetermined packet transmission buffer in the self-station priority control circuit 34 and a time when the downlink packet is outputted from the predetermined packet transmission buffer in the self-station priority control circuit 34. The Qos monitoring circuit 33 uses a value of the Qos requirement received from the identification circuit 32 as the predetermined threshold.

When the Qos monitoring circuit 33 detects that the Qos of the downlink packet is ensured, the Qos monitoring circuit 33 notifies the peripheral base station interface 45 that the Qos of the downlink packet is ensured.

The self-station priority control circuit 34 is connected to the identification circuit 32, the Qos monitoring circuit 33, the signal multiplexer circuit 36, the peripheral base station list acquisition circuit 44, and the peripheral base station interface circuit 45. The self-station priority control circuit 34 includes the packet transmission buffers for the respective traffic types.

The self-station priority control circuit 34 stores the downlink packet received from the identification circuit 32 in the predetermined packet transmission buffer in accordance with the traffic type received from the identification circuit 32. At this time, the self-station priority control circuit 34 memorizes the time of storing the downlink packet.

The self-station priority control circuit 34 fetches out (extracts) the downlink packet from each packet transmission buffer in accordance with the priority of each traffic type, and then transmits the downlink packet to the signal multiplexer circuit 36.

The self-station priority control circuit 34 performs resource control in accordance with the notification from the Qos monitoring circuit 33 and the peripheral base station list acquisition circuit 44. For example, in accordance with the notification from the Qos monitoring circuit 33 and the peripheral base station list acquisition circuit 44, the self-station priority control circuit 34 temporarily suppresses the use of resources for transmitting non-real time packets, packets of low priority, or real time packet having a margin for Qos within the own cell.

The self-station priority control circuit 34 performs resource control in accordance with urgency of a resource allocation control request from the peripheral base station interface circuit 45. For example, in accordance with the urgency of the resource allocation control request from the peripheral base station interface circuit 45, the self-station priority control circuit 34 temporarily suppresses the use of resources for transmitting non-real time packets, packets of low priority, or real time packets having a margin for Qos within the own cell.

An example of the above described resource allocation control request is shown in FIG. 5. For example, as shown in FIG. 5, the self-station priority control circuit 34 temporarily stops the transmission of packets of the "BE type" in the case of receiving a resource allocation control request of a "low" urgency.

The self-station priority control circuit 34 temporarily stops the transmission of packets (non-real time packets) of the "BE type", "AF1 type", "AF2 type" and "AF3 type" in the case of receiving a resource allocation control request of a "medium" urgency.

The self-station priority control circuit 34 temporarily stops the transmission of packets (non-real time packets and real time packets having enough time) of the "BE type", "AF1 type", "AF2 type", "AF3 type" and "AF4 type" in the case of receiving a resource allocation control request of a "high" urgency.

In the above described case, the self-station priority control circuit 34 can sequentially suppress the use of resources starting from the packet having a large transmission power, depending on the location of the mobile stations or the like. Therefore, the self-station priority control circuit 34 can suppress the use of resources while reducing the number of packets which are prevented from being transmitted.

Furthermore, in accordance with a resource allocation control release request from the peripheral base station interface circuit 45, the self-station priority control circuit 34 releases the temporary stop of transmission of non-real time packets, packets of low priority, or real time packets having a margin for Qos within the own cell.

The inquiry circuit 35 is connected to the Qos monitoring circuit 33 and the signal multiplexer circuit 36. In accordance with the notification (notification that the Qos of the downlink packet is not ensured) from the Qos monitoring circuit 33, the inquiry circuit 35 inquires of the mobile station 10, which is a destination of the packet, via the signal multiplexer circuit 36, about the peripheral base stations 30 (peripheral base station list) from which the mobile station 10 is prone to receive interference.

The signal multiplexer circuit 36 is connected to the self-station priority control circuit 34, the inquiry circuit 35, and the encoder circuit 37. The signal multiplexer circuit 36 multiplexes the downlink packet received from the self-station priority control circuit 34 and the inquiry from the inquiry circuit 35, and transmits the multiplexed signal to the encoder circuit 37.

The encoder circuit 37 is connected to the signal multiplexer circuit 36 and the modulator circuit 38. The encoder circuit 37 encodes the multiplexed signal received from the signal multiplexer circuit 36 and transmits the encoded signal to the modulator circuit 38.

The modulator circuit 38 is connected to the encoder circuit 37 and the circulator 39. The modulator circuit 38 modulates the encoded signal received from the encoder circuit 37 and transmits the modulated signal to the circulator 39.

The circulator 39 is connected to the modulator circuit 38, the radio antenna $39_a$, and the demodulator circuit 40. The circulator 39 switches between transmission processing of the downlink modulated signal from the modulator circuit 38 to the radio antenna $39_a$ and reception processing of the uplink modulated signal from the radio antenna $39_a$ to the demodulator circuit 40.

The demodulator circuit 40 is connected to the circulator 39 and the decoder circuit 41. The demodulator circuit 40 demodulates the modulated uplink signal received from the circulator 39 and transmits the demodulated signal to the decoder circuit 41.

The decoder circuit 41 is connected to the demodulator circuit 40 and the signal demultiplexer circuit 42. The decoder circuit 41 decodes the encoded signal received from the demodulator circuit 40, and transmits the decoded signal to the signal demultiplexer circuit 42.

The signal demultiplexer circuit 42 is connected to the decoder circuit 41, the uplink information transmitter 43, and the peripheral base station list acquisition circuit 44. The signal demultiplexer 42 demultiplexer the decoded signal received from the decoder circuit 41 and extracts the uplink packet and the peripheral base station list. The signal demultiplexer 42 then transmits the extracted uplink packet to the uplink information transmitter 43 and transmits the peripheral base station list to the peripheral base station list acquisition circuit 44.

The uplink information transmitter 43 is connected to the signal demultiplexer circuit 42. The uplink information transmitter 43 transmits the uplink packet from the signal demultiplexer circuit 42 to the upper network.

The peripheral base station list acquisition circuit 44 is connected to the self-station priority control circuit 34, the signal demultiplexer circuit 42, and the peripheral base station interface circuit 45. The peripheral base station list acquisition circuit 44 notifies the self-station priority control circuit 34 of the reception of the peripheral base station list from the signal demultiplexer circuit 42. Moreover, the peripheral base station list acquisition circuit 44 transmits the peripheral base station list from the signal demultiplexer circuit 42 to the peripheral base station interface circuit 45.

The peripheral base station interface circuit 45 is connected to the Qos monitoring circuit 33, the self-station priority control circuit 34, and the peripheral base station list acquisition circuit 44. In accordance with the notification from the Qos monitoring circuit 33, the peripheral base station interface circuit 45 transmits the resource allocation control request and the resource allocation control release request to each peripheral base station 30 in a certain cycle (for example, at intervals of one or a plurality of frames) or as needed by use of the peripheral base station list from the peripheral base station list acquisition circuit 44.

When the peripheral base station interface circuit 45 receives the notification from the Qos monitoring circuit 33 that the Qos of the downlink packet is not ensured, the peripheral base station interface circuit 45 determines the urgency and the number of peripheral base stations to which the peripheral base station interface circuit 45 is to transmit a resource allocation control request according to "a ratio of downlink packets having the Qos not ensured (a ratio of the users with the unsatisfied Qos)".

Specifically, as shown in FIG. 5, if the "ratio of the users with the unsatisfied Qos" is "not more than ⅓", the peripheral base station interface circuit 45 transmits a resource allocation control request of a "low" urgency to one of the peripheral base stations 30.

If the "ratio of the users with the unsatisfied Qos" is "more than ⅓ and less than ⅔", the peripheral base station interface circuit 45 transmits a resource allocation control request of a "medium" urgency to two of the peripheral base stations 30.

If the "ratio of the users with the unsatisfied Qos" is "not less than ⅔", the peripheral base station interface circuit 45 transmits a resource allocation control request of a "high" urgency to three of the peripheral base stations 30.

Here, the peripheral base stations 30 to which the resource allocation control request is to be transmitted are selected in an order of the peripheral base station list.

When the peripheral base station interface circuit 45 receives the notification from the Qos monitoring circuit 33 that the downlink packets has come to be ensured, the peripheral base station interface circuit 45 transmits the resource allocation control release request to the predetermined peripheral base station 30.

The peripheral base station interface circuit 45 transmits the resource allocation control request and the resource allocation control release request from each peripheral base station 30 to the self-station priority control circuit 34.

In the case where the resource allocation control request and the resource allocation control release request are transmitted in a constant cycle, the peripheral base station interface circuit 45 checks the existence of the resource allocation control request and the resource allocation control release request for each peripheral base station 30 in a constant cycle.

FIG. 6 shows a functional block diagram of each mobile station 10 for real time communication. The mobile station 10 includes a circulator 11, a radio antenna 11$_a$, a demodulator circuit 12, a decoder circuit 13, a signal demultiplexer circuit 14, a downlink information output unit 15, a Qos monitoring circuit 16, a peripheral base station search circuit 17, an uplink information input unit 18, a signal multiplexer circuit 19, an encoder circuit 20, and a modulator circuit 21.

In the embodiment, the peripheral base station search circuit 17 constitutes a second base station information transmitter, which transmits information (peripheral base station list) regarding the second base station of a high interference level to the first base station (base station 30) in accordance with a request from the first base station (base station 30).

The circulator 11 is connected to the radio antenna 11$_a$, the modulator circuit 21, and the demodulator circuit 12. The circulator 11 switches between transmission processing of the uplink modulated signal from the modulator circuit 21 to the radio antenna 11$_a$ and reception processing of the downlink modulated signal from the radio antenna 11$_a$ to the demodulator circuit 12.

The demodulator circuit 12 is connected to the circulator 11 and the decoder circuit 13. The demodulator circuit 12 demodulates the modulated downlink signal received from the circulator 11 and transmits the demodulated signal to the decoder circuit 13.

The decoder circuit 13 is connected to the demodulator circuit 12 and the signal demultiplexer circuit 14. The decoder circuit 13 decodes the encoded signal from the demodulator circuit 12 and transmits the decoded signal to the signal demultiplexer circuit 14.

The signal demultiplexer circuit 14 is connected to the decoder circuit 13, the downlink information output unit 15, the Qos monitoring circuit 16, and the peripheral base station search circuit 17. The signal demultiplexer circuit 14 demultiplexer the decoded signal received from the decoder circuit 13 and extracts the downlink packet and the inquiry. The signal demultiplexer circuit 14 transmits the extracted downlink packet to the downlink information output unit 15, and transmits the extracted inquiry to the peripheral base station search circuit 17.

The downlink information output unit 15 is connected to the signal demultiplexer circuit 14. The downlink information output unit 15 outputs the downlink packet received from the signal demultiplexer circuit 14. The downlink information output unit 15 is configured with, for example, a display screen of the mobile station, a speaker thereof, or the like.

The Qos monitoring circuit 16 is connected to the signal demultiplexer circuit 14 and the peripheral base station search circuit 17. The Qos monitoring circuit 16 monitors the "Qos (in this embodiment, at least one of a delay jitter, an error rate (PER), and a transmission rate)" for the downlink packet transmitted to the signal demultiplexer circuit 14 at constant intervals, and judges whether or not the Qos of the downlink packet is ensured.

The Qos monitoring circuit 16 may monitor the Qos of the downlink packet of only the predetermined traffic type (for example, real time packet or packet of high priority). The Qos monitoring circuit 16 may monitor the buffer residence time of the downlink packet.

When the Qos monitoring circuit 16 judges that the Qos of the downlink packet transmitted to the signal demultiplexer circuit 14 is not ensured, the Qos monitoring circuit 16 notifies the peripheral base station search circuit 17 of the judgment.

The peripheral base station search circuit 17 is connected to the signal demultiplexer circuit 14, the Qos monitoring circuit 16, and the signal multiplexer circuit 19. In response to the inquiry from the signal demultiplexer circuit 14 or the notification (notification that the Qos of the downlink packet is not ensured) from the Qos monitoring circuit 16, the peripheral base station search circuit 17 measures the received signal levels of control signals (for example, CPICH) of the peripheral base stations 30, and creates a peripheral base station list having the peripheral base stations 30 arranged in descending order of the above described received signal levels. The peripheral base station search circuit 17 then transmits the peripheral base station list to the signal multiplexer circuit 19 together with the notification that the Qos of the downlink packet is not ensured.

The uplink information input unit 18 is connected to the signal multiplexer circuit 19. The uplink information input unit 18 is an input interface for allowing the user of the mobile station 10 to input data (including voice information), which creates an uplink packet based on the inputted data, and transmits the created uplink packet to the signal multiplexer circuit 19. In creating the uplink packet, the uplink information input unit 18 sets the DSCP (traffic type) in a packet header in accordance with contents of the data.

The signal multiplexer circuit 19 is connected to the peripheral base station search circuit 17 and the uplink information input unit 18. The signal multiplexer circuit 19 multiplexes the notification and the peripheral base station list from the peripheral base station search circuit 17 and the uplink packet from the uplink information input unit 18, and transmits the multiplexed signal to the encoder circuit 20.

The encoder circuit 20 is connected to the signal multiplexer circuit 19 and the modulator circuit 21. The encoder circuit 20 encodes the multiplexed signal from the signal multiplexer circuit 19 and transmits the encoded signal to the modulator circuit 21.

The modulator circuit 21 is connected to the encoder circuit 20 and the circulator 11. The modulator circuit 21 modulates the encoded signal from the encoder circuit 20 and transmits the modulated signal to the circulator 11.

(Operation of Resource Control System According to this Embodiment)

Figure 7:
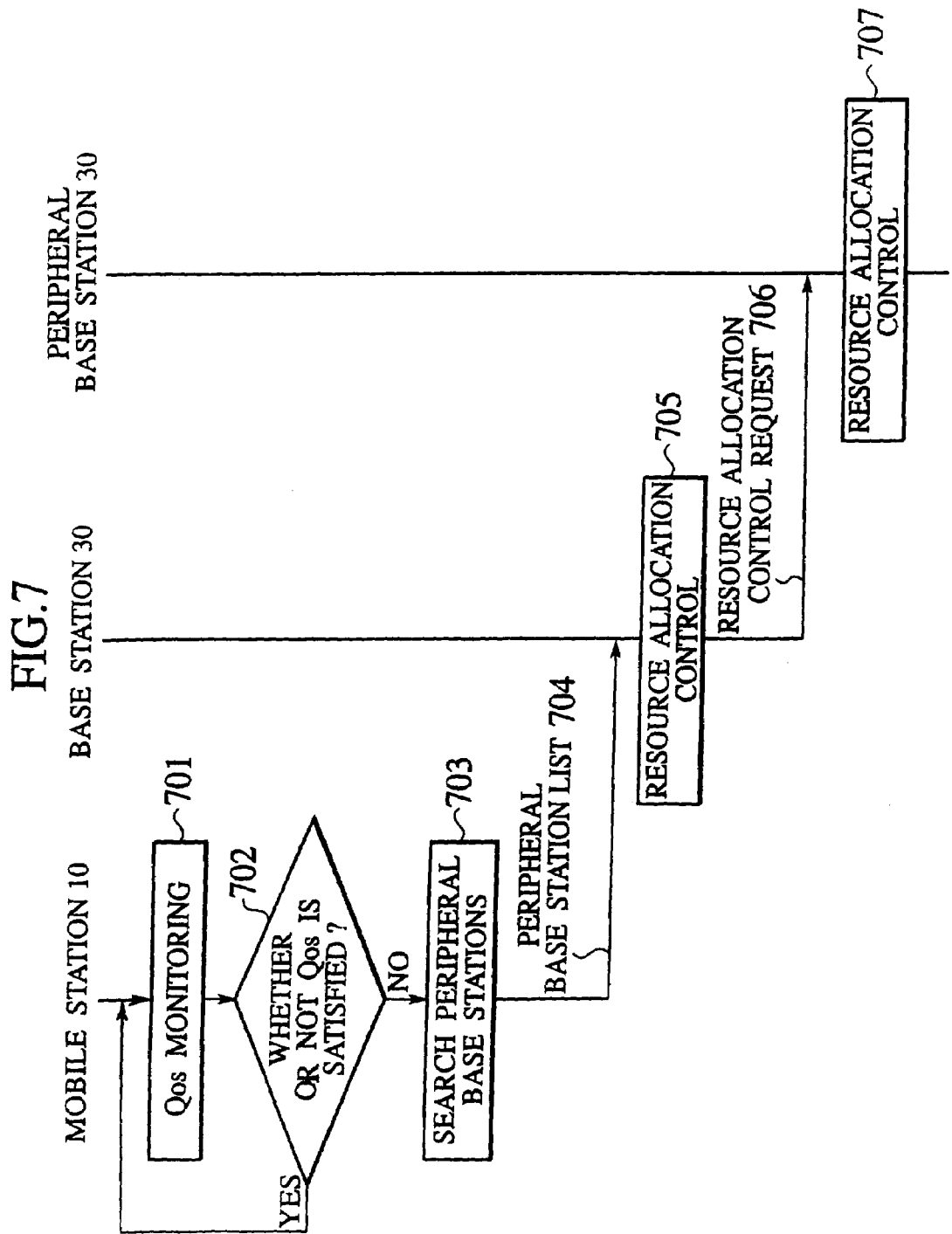
FIG. 7 is a time chart showing an operation of the resource control system according to the embodiment of the present invention.
Figure 8:
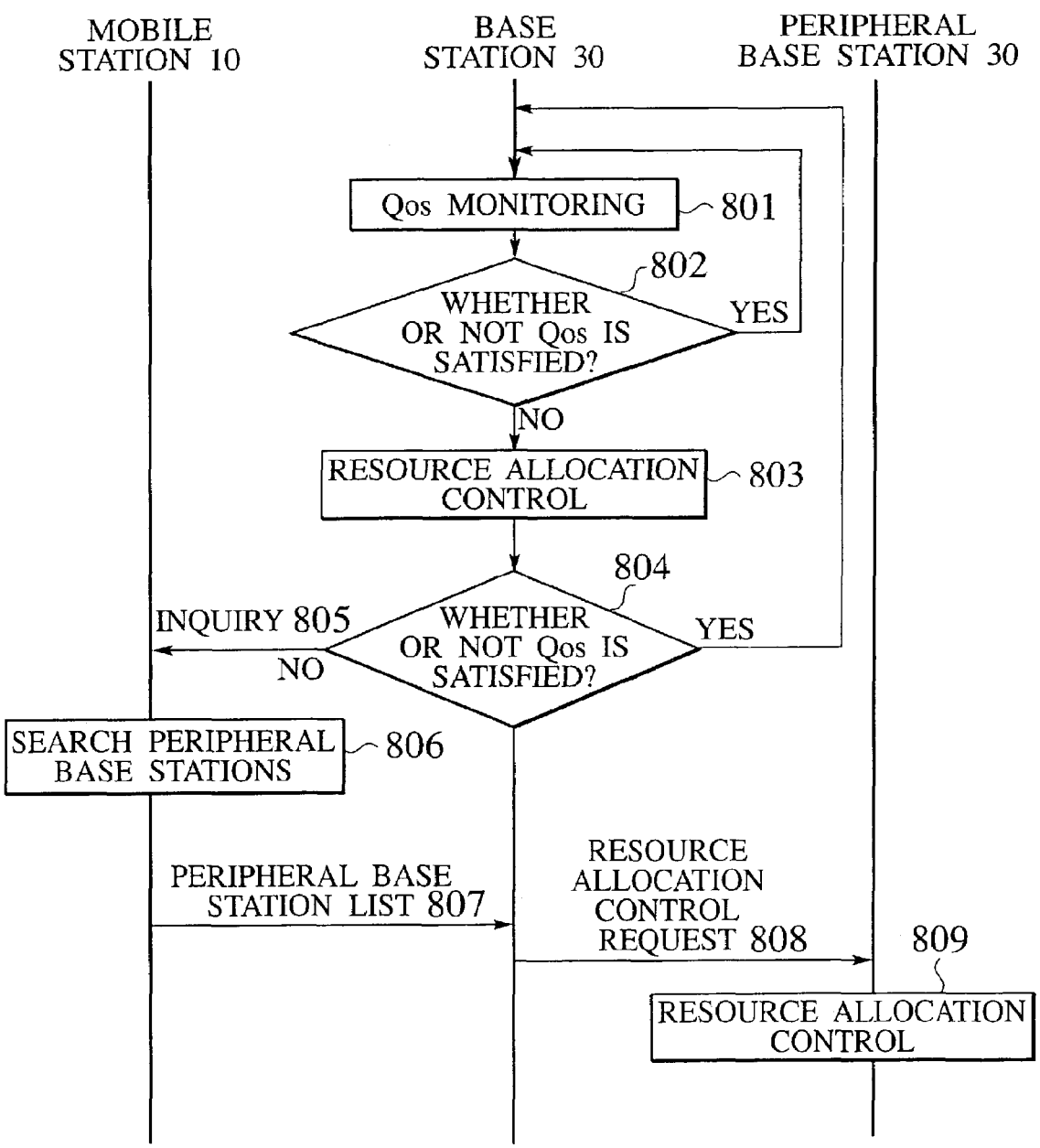
FIG. 8 is a time chart showing the operation of the resource control system according to the embodiment of the present invention.

A description will be made of an operation of the resource control system according to this embodiment with reference to the drawings. FIG. 7 is a time chart showing an operation of the resource control system according to this embodiment in a case where each mobile station 10 monitors the Qos of the downlink packet. FIG. 8 is a time chart showing operations of the resource control system according to this embodiment in a case where each base station 30 monitors the Qos of the downlink packet.

First, a description will be made for the operation of the resource control system according to this embodiment in the case where the mobile station 10 monitors the Qos of the downlink packet.

As shown in FIG. 7, in step 701, the Qos monitoring circuit 16 of the mobile station 10 monitors the "Qos (in this embodiment, at least any one of a delay jitter, an error rate (PER), and a transmission rate of the packet)" at constant intervals for the downlink packet transmitted to the signal demultiplexer circuit 14.

In step 702, the Qos monitoring circuit 16 judges whether or not the Qos of the downlink packet transmitted to the signal demultiplexer circuit 14 is ensured. When the Qos monitoring circuit 16 judges the Qos of the downlink packet to be ensured, the operation returns to step 701. When the Qos monitoring circuit 16 judges that the Qos of the downlink packet is not ensured, the operation proceeds to step 703.

In step 703, the Qos monitoring circuit 16 notifies the peripheral base station search circuit 17 that the Qos of the downlink packet is not ensured. The peripheral base station search circuit 17 measures the received signal level of the control signal (for example, CPICH) of each peripheral base station 30 (indicated by "a" in FIG. 1), and creates the peripheral base station list.

In step 704, the peripheral base station search circuit 17 transmits the notification that the Qos of the downlink packet is not ensured and the peripheral base station list via the signal multiplexer circuit 19, the encoder circuit 20, the modulator circuit 21, the circulator 11, and the radio antenna $11_a$ (indicated by "b" in FIG. 1).

In step 705, the self-station priority control circuit 34 of the base station 30 performs resource allocation control in accordance with the notification of reception of the peripheral base station list from the peripheral base station list acquisition circuit 44. Specifically, the self-station priority control circuit 34 of the base station 30 temporarily suppresses the use of resources for transmitting non-real time packets, packets of low priority, or real time packets having a margin for Qos within the own cell.

In step 706, when the self-station priority control circuit 34 again receives the peripheral base station list from the peripheral base station list acquisition circuit 44 or receives the notification that "the Qos of the downlink packet is not ensured" from the mobile station 10 via the peripheral base station list acquisition circuit 44, the peripheral base station interface circuit 45 transmits the resource allocation control request to the predetermined peripheral base station 30 (indicated by "c" in FIG. 1).

In step 707, the self-station priority control circuit 34 of each peripheral base station 30 performs the resource allocation control in accordance with the resource allocation control request (especially, urgency) received via the peripheral base station interface circuit 45.

Secondly, a description will be made for the operation in the case where the base station 30 monitors the Qos of the downlink packet in the resource control system according to this embodiment.

As shown in FIG. 8, in step 801, the Qos monitoring circuit 33 of the base station 30 monitors the "Qos (in this embodiment, buffer residence time)" of the downlink packet in the packet transmission buffer of the self-station priority control circuit 34.

In step 802, the Qos monitoring circuit 33 judges whether or not the Qos of the downlink packet is ensured, in other words, whether or not the buffer residence time of the downlink packet exceeds the predetermined threshold ("Qos requirement in FIG. 3"). When the Qos monitoring circuit 33 judges the Qos of the downlink packet to be ensured, the operation returns to step 801. When the Qos monitoring circuit 33 judges that the Qos of the downlink packet is not ensured, the operation proceeds to step 803.

In step 803, the self-station priority control circuit 34 temporarily suppresses the use of resources for transmitting non-real time packets, packets of low priority, or real time packets having a margin for Qos within the own cell.

In step 804, the Qos monitoring circuit 33 judges whether or not the Qos of the downlink packet is ensured, in other words, whether or not the buffer residence time of the downlink packet exceeds the predetermined threshold ("Qos requirement in FIG. 3"). When the Qos monitoring circuit 33 judges the Qos of the downlink packet to be ensured, the operation returns to step 801. When the Qos monitoring circuit 33 judges that the Qos of the downlink packet is not ensured, the operation proceeds to step 805.

In step 805, in accordance with the notification from the Qos monitoring circuit 33, the inquiry circuit 35 inquires of the mobile station 10, which is the destination of the downlink packet, about the peripheral base stations 30 from which the mobile station 10 is prone to receive the interference. The inquiry is made via the signal multiplexer circuit 36, the encoding circuit 37, the modulator circuit 38, the circulator 39, and the radio antenna $39_a$.

In step 806, the peripheral base station search circuit 17 of the mobile station 10 creates the peripheral base station list as described above in response to the inquiry received via the radio antenna $11_a$, the circulator 11, the demodulator circuit 12, the decoder circuit 13, and the signal demultiplexer circuit 14.

In step 807, the peripheral base station search circuit 17 transmits the peripheral base station list via the signal multiplexer circuit 19, the encoder circuit 20, the modulator circuit 21, the circulator 11, and the radio antenna $11_a$.

In step 808, the peripheral base station interface 45 transmits the resource allocation control request to the predetermined peripheral base station 30.

In step 809, the self-station priority control circuit 34 of each peripheral base station 30 performs resource allocation control in accordance with the resource allocation control request (especially, regarding urgency) received via the peripheral base station interface circuit 45.

(Operation and Effect of Resource Control System According to this Embodiment)

According to the resource control system of this embodiment, the self-station priority control circuit 34 suppresses the use of resources for packet communication between the base station 30 and the mobile station 10 in accordance with the request from each peripheral base station 30.

Accordingly, each base station can autonomously control resources, and a station controlling the base stations becomes unnecessary, thus enabling efficient resource control.

According to the resource control system of this embodiment, the resource control of the own cell 1 can be performed in cooperation with the resource control of the peripheral cell 2, thus enabling the improvement of the Qos and the effective use of resources with regard to the entire packet mobile communication system.

(Constitution of Resource Control System According to Embodiment 2)

A description will be made of a resource control system according to an embodiment 2 of the present invention with reference to the drawings. The resource control system according to this embodiment is intended to perform "uplink resource (radio channel) control". Hereinafter, a difference from the constitution of the resource control system according to the embodiment 1 will be mainly described.

The resource control system according to this embodiment differs from the resource control system according to the embodiment 1 in that the base station 30 does not include the identification circuit 32, the inquiry circuit 35, and the peripheral base station list acquisition circuit 44. Moreover, in the base station 30, the resource control system according to this embodiment differs from that of the embodiment 1 in functions and arrangement of a Qos monitoring circuit 51, a self-station priority control circuit 52, and a peripheral base station interface circuit 53.

The resource control system according to this embodiment also differs from the resource control system according to the embodiment 1 in that the mobile station 10 does not include the peripheral base station search circuit 17 and includes a transmission control circuit 61. Moreover, in the mobile station 10, the resource control system according to this embodiment differs from that of the embodiment 1 in function and arrangement of a Qos monitoring circuit 62.

In this embodiment, the Qos monitoring circuit 62 of the mobile station 10 constitutes an uplink packet judgment unit, which judges whether or not the Qos of the uplink packet is ensured by recognizing the traffic type of the uplink packet directed to the first base station (base station 30) and comparing the threshold predetermined for each traffic type with the Qos of the uplink packet.

The Qos monitoring circuit 62 of the mobile station constitutes a notification unit, which notifies the first base station (base station 30) of the judgment when the Qos of the uplink packet is judged not to be ensured.

The Qos monitoring circuit 51 of the base station 30 is connected to the signal demultiplexer circuit 42, the uplink information transmitter 43 and a self-station priority control circuit 52. The Qos monitoring circuit 51 monitors the "Qos (at least any one of a delay jitter, an error rate, and a transmission rate of the uplink packet in this embodiment)" in the signal demultiplexer circuit 42 and judges whether or not the Qos of the uplink packet is ensured, or judges whether or not the resources necessary for a new uplink packet are secured.

In accordance with a reservation signal received from the mobile station 10 via the signal demultiplexer circuit 42, the Qos monitoring circuit 51 notifies the self-station priority control circuit 52 of a result of judgment whether or not the resources necessary for the uplink packet corresponding to the reservation signal are secured.

When the Qos monitoring circuit 51 detects that the Qos of the uplink packet is not ensured or that the resources for the new uplink packet are not secured, the Qos monitoring circuit 51 notifies the self-station priority control circuit 52 of the detected result.

When the Qos monitoring circuit 51 receives the notification that "the Qos of the uplink packet is not ensured in the mobile station 10" via the signal demultiplexer circuit 42, the Qos monitoring circuit 51 notifies the self-station priority control circuit 52 of the reception of the notification.

The self-station priority control circuit 52 is connected to the signal multiplexer circuit 36, the Qos monitoring circuit 51, and the peripheral base station interface circuit 53. When the self-station priority control circuit 52 receives the notification from the Qos monitoring circuit 51 that the resources necessary for the new packet are secured, the self-station priority control circuit 51 allocates the resources for transmission of the uplink packet, and then transmits the allocation result to the mobile station 10 via the signal multiplexer circuit 36. In such a case, the self-station priority control circuit 52 specifies access conditions (for example, mean transmission intervals) for each traffic type.

When the self-station priority control circuit 52 receives from the Qos monitoring circuit 51 the notification that the Qos of the uplink packet is not ensured or the notification that the necessary resources for the new uplink packet are not secured, and when the uplink packet is a non-real time packet, the self-station priority control circuit 52 postpones the allocation of resources to the uplink packet for a certain period of time.

When the self-station priority control circuit 52 receives from the Qos monitoring circuit 51 the notification that the Qos of the uplink packet is not ensured or the notification that the necessary resources for the new uplink packet are not secured, and when the uplink packet is a real time packet, the self-station priority control circuit 52 temporarily suppresses the allocation of uplink resources to non-real time packets.

Thereafter, when the self-station priority control circuit 52 receives another notification that the necessary resources for the new uplink packet are not secured, the self-station priority control circuit 52 notifies the peripheral base station interface circuit 53 of the reception of the notification.

The self-station priority control circuit 52 performs resource control in accordance with urgency of the resource allocation control request from the peripheral base station interface circuit 53. For example, in accordance with the urgency of the resource allocation control request from the peripheral base station interface circuit 53, the self-station priority control circuit 52 temporarily suppresses the use of resources for transmitting non-real time packets, packets of low priority, or real time packets having a margin for Qos within the own cell.

An example of the above described resource allocation control request is shown in FIG. 10. For example, as shown in FIG. 10, the self-station priority control circuit 52 temporarily stops transmission of the packets of the "BE type" in the case of receiving the resource allocation control request of a "low" urgency.

The self-station priority control circuit 52 temporarily stops transmission of the packets (non-real time packets) of the "BE type", "AF1 type", "AF2 type" and "AF3 type" in the case of receiving the resource allocation control request of a "medium" urgency.

The self-station priority control circuit 52 temporarily stops transmission of the packets (non-real time packets and real time packets having enough time) of the "BE type", "AF1 type", "AF2 type", "AF3 type" and "AF4 type" in the case of receiving the resource allocation control request of a "high" urgency.

In the above described case, the self-station priority control circuit 52 can sequentially suppress the use of resources starting from the packets having a large transmission power, depending on the location of the mobile stations or the like. Therefore, the self-station priority control circuit 52 can suppress the use of resources while reducing the number of packets that are temporarily prevented from being transmitted.

Furthermore, in accordance with a resource allocation control release request from the peripheral base station interface circuit 53, the, self-station priority control circuit 52 releases the temporary ceasing of transmission of non-real time packets, packets of low priority, or real time packets having a margin for Qos within the own cell.

The peripheral base station interface circuit 53 is connected to the self-station priority control circuit 52. In accordance with the notification from the self-station priority control circuit 52, the peripheral base station interface circuit 53 transmits the resource allocation control request and the resource allocation control release request to each peripheral base stations 30 in a certain cycle (for example, at intervals of one or a plurality of frames) or as needed.

When the peripheral base station interface circuit 53 receives the notification from the peripheral base station interface circuit 52 that the Qos of the uplink packet is not ensured, the peripheral base station interface circuit 53 determines the urgency and the number of peripheral base stations, to which the peripheral base station interface circuit 53 is to transmit the resource allocation control request, in accordance with "a ratio of uplink packets having the Qos not ensured (a ratio of users with the unsatisfied Qos)" or "users-with insufficient resources allocated".

Specifically, as shown in FIG. 10, if the "ratio of users with the unsatisfied Qos" or the "ratio of users with insufficient resources allocated" is "not more than 1/3", the peripheral base station interface circuit 53 transmits the resource allocation control request of a "low" urgency to one of the peripheral base stations 30.

If the "ratio of users with the unsatisfied Qos" or the "ratio of users with insufficient resources allocated" is "more than 1/3 and less than 2/3", the peripheral base station interface circuit 53 transmits the resource allocation control request of a "medium" urgency to two of the peripheral base stations 30.

If the "ratio of users with the unsatisfied Qos" or the "ratio of users with insufficient resources allocated" is "not less than 2/3", the peripheral base station interface circuit 53 transmits the resource allocation control request of a "high" urgency to three of the peripheral base stations 30.

When the peripheral base station interface circuit 53 receives from the self-station priority control circuit 52 the notification of detection that the Qos of the uplink packet is ensured, or the notification of detection that the resources necessary for the new uplink packet are secured, the peripheral base station interface circuit 53 transmits the resource allocation control release request to the predetermined peripheral base station 30.

The peripheral base station interface circuit 53 transmits the resource allocation control request and the resource allocation control release request from the peripheral case station 30 to the self-station priority control circuit 52.

If the resource allocation control request and the resource allocation control release request are transmitted in a constant cycle, the peripheral base station interface circuit 53 checks the existence of the resource allocation control request and the resource allocation control release request for each peripheral base station 30 in the constant cycle.

Figure 11:
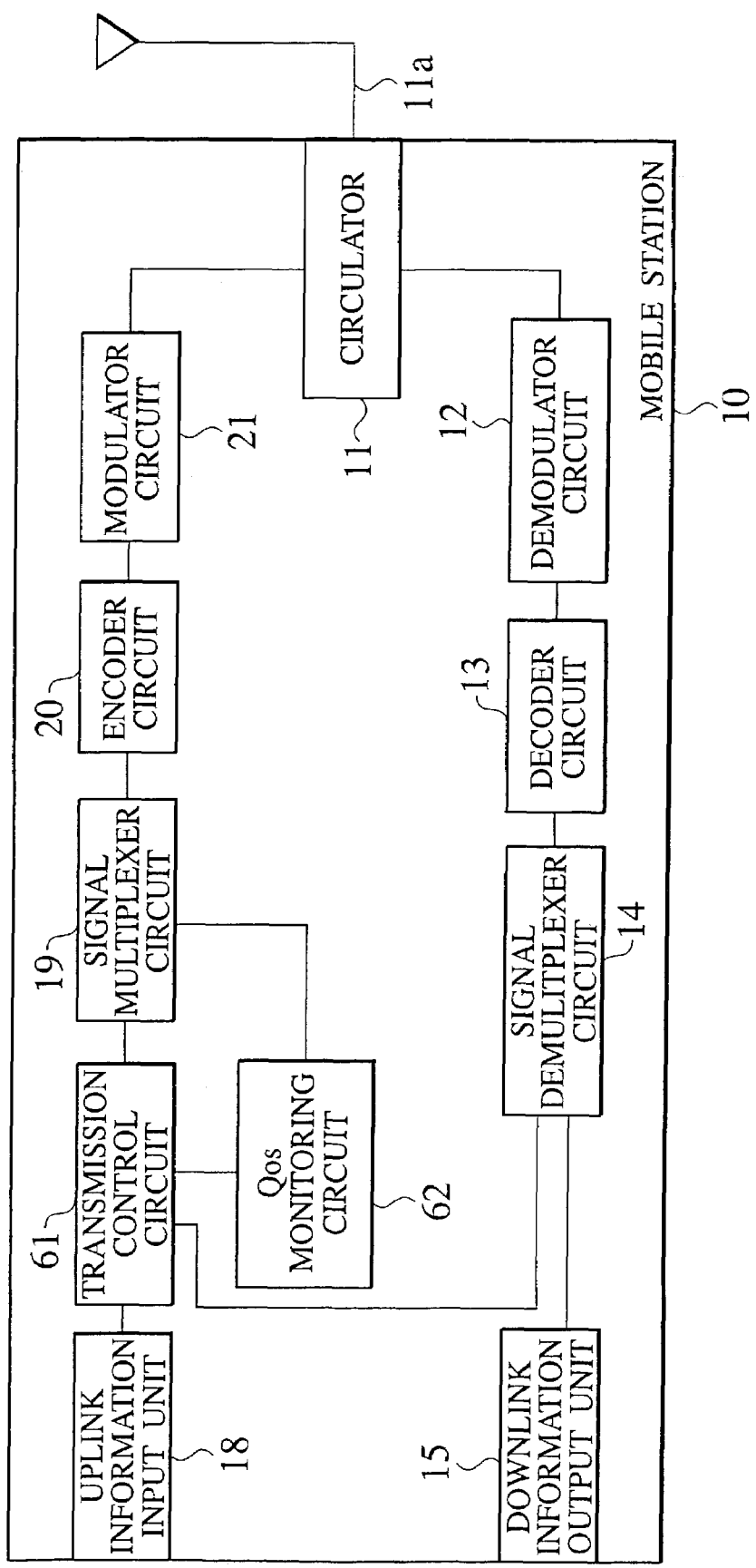
FIG. 11 is a functional block diagram of a mobile station according to the embodiment of the present invention.

As shown in FIG. 11, the uplink information input unit 18 of the mobile station 10 is connected to the transmission control circuit 61. The uplink information input unit 18 transmits a reservation signal including the traffic type and the Qos requirement (packet transmission delay, packet discard rate, transmission rate, etc.) via the transmission control circuit 61, the signal multiplexer circuit 19, the encoder circuit 20, the modulator circuit 21, the circulator 11, and the radio antenna 11$_a$.

The transmission control circuit 61 is connected to the uplink information input unit 18, the signal multiplexer circuit 19, and the Qos monitoring circuit 62. The transmission control circuit 61 fetches out (extracts) the uplink packet from the packet transmission buffer and transmits the fetched (extracted) uplink packet at a transmission power and a timing of transmission in accordance with an instruction of resource allocation from the base station 30.

The Qos monitoring circuit 62 is connected to the transmission control circuit 61 and the signal multiplexer circuit 19. The Qos monitoring circuit 62 monitors the "Qos (in this embodiment, at least one of the buffer residence time, the delay jitter, the error rate, and the transmission rate)" of the uplink packet within the packet transmission buffer of the transmission control circuit 61, and judges whether or not the Qos of the uplink packet is ensured. The Qos monitoring circuit 62 can also determine a ratio of the downlink packets having the Qos not ensured for a predetermined period of time.

Specifically, when the Qos of the uplink packet exceeds the predetermined threshold (for example, a value of the "Qos requirement (allowed delay time)" in FIG. 3), the Qos monitoring circuit 62 judges that the Qos of the uplink packet is not ensured, and then notifies the base station 30 of the result.

(Operation of Resource Control System According to this Embodiment)

A description will be made for an operation of the resource control system according to this embodiment with reference to the drawings. FIG. 12 is a time chart showing an operation of the resource control system according to this embodiment in a case where the mobile station 10 transmits the reservation signal. FIG. 13 is a time chart showing an operation of the resource control system according to this embodiment in a case where the mobile station 10 does not transmit the reservation signal.

First, a description will be made for the operations of the resource control system according to this embodiment in the case where the mobile station 10 transmits the reservation signal.

As shown in FIG. 12, in step 1201, the reservation signal is transmitted via the uplink information input unit 18, the priority control circuit 61, the signal multiplexer circuit 19, the encoder circuit 20, the modulator circuit 21, the circulator 11, and the radio antenna 11$_a$ of the mobile station 10 to the base station 30 in the cell where the mobile station 10 is located.

In step 1202, the Qos monitoring circuit 51 of the base station 30 judges whether or not the resources necessary for the new uplink packet corresponding to the reservation signal are secured. When the resources are judged to be secured, the operation proceeds to step 1203. When the resources are judged not to be secured, the operation proceeds to step 1205.

In step 1203, the self-station priority control circuit 52 allocates the resources to the above described uplink packet. In step 1204, the self-station priority control circuit 52 transmits the result of the allocation to the mobile station 10 via the signal multiplexer circuit 36, the encoder circuit 37, the modulator circuit 38, the circulator 39, and the radio antenna 39a.

In step 1205, the self-station priority control circuit 52 judges whether or not the uplink packet is a real time packet. When the uplink packet is judged to be a real time packet, the operation proceeds to step 1207. When the uplink packet is judged not to be a real time packet, the operation proceeds to step 1206.

In step 1206, the self-station priority control circuit 52 postpones the allocation of resources for the uplink packet for a certain period of time.

In step 1207, the self-station priority control circuit 52 temporarily suppresses allocation of uplink resources for the non-real time packet. Thereafter, when the self-station priority control circuit 52 receives another notification from the Qos monitoring circuit 51 that the Qos of the uplink packet is not ensured, the self-station priority control circuit 52 notifies the peripheral base station interface circuit 53 of the reception of the notification.

In step 1208, in accordance with the notification from the self-station priority control circuit 52, the peripheral base station interface circuit 53 transmits the resource allocation control request to each peripheral base station 30 in a constant cycle (for example, at intervals of one or a plurality of frames) or as needed.

In step 1209, the self-station priority control circuit 52 of the peripheral base station 30 performs resource allocation control in accordance with the resource allocation control request (especially, urgency) received via the peripheral base station interface circuit 53.

In step 1210, communication between the mobile station 10 and the base station 30 is started at a transmission level and a transmission timing in accordance with the instruction of resource allocation from the base station 30.

In step 1211, the Qos monitoring circuit 51 of the base station 30 monitors the Qos of the uplink packet in the signal demultiplexer circuit 42. In step 1212, the Qos monitoring circuit 51 judges whether or not the Qos of the uplink packet is ensured. When the Qos of the uplink packet is judged to be ensured, the operation returns to step 1211. When the Qos of the uplink packet is judged not to be ensured, the operation proceeds to step 1213.

In step 1213, the self-station priority control circuit 52 of the base station 30 performs resource allocation control. Specifically, the self-station priority control circuit 52 temporarily suppresses the use of resources for transmitting non-real time packets, packets of low priority, or real time packets having a margin for Qos within the own cell.

In step 1214, when the Qos monitoring circuit 51 judges that the Qos of the uplink packet is not ensured even by the above described resource allocation control, the peripheral base station interface circuit 53 transmits the resource allocation control request to the predetermined peripheral base station 30.

In step 1215, the self-station priority control circuit 52 of the peripheral base station 30 performs the resource allocation control in accordance with the resource allocation control request (especially, urgency) received via the peripheral base station interface circuit 53.

Secondly, a description will be made for the operation of the resource control system according to this embodiment in the case where the mobile station 10 does not transmit the reservation signal.

As shown in FIG. 13, in step 1301, when the self-station priority control circuit 52 receives the notification from the Qos monitoring circuit 51 that the Qos of the uplink packet is ensured, the self-station priority control circuit 52 allocates resources to the uplink packet, and determines the access conditions (for example, mean transmission interval) of each traffic type.

In step 1302, the self-station priority control circuit 52 transmits the result of the allocation to the mobile station 10 via the signal multiplexer circuit 36, the encoder circuit 37, the modulator circuit 38, the circulator 39, and the radio antenna $39_a$.

In step 1303, communication between the mobile station 10 and the base station 30 is started under the access conditions (for example, mean transmission interval) of each traffic type in accordance with the instruction of resource allocation from the base station 30.

In step 1304, the Qos monitoring circuit 62 of the mobile station 10 monitors the "Qos (buffer residence time in this embodiment)" of the uplink packet in the transmission control circuit 61 and judges whether or not the Qos of the uplink packet is ensured.

When the Qos of the uplink packet is judged to be ensured, the operation returns to step 1303. When the Qos of the uplink packet is judged not to be ensured, the operation proceeds to step 1305. In step 1305, the Qos monitoring circuit 62 notifies the base station 30 that the Qos of the uplink packet is not ensured.

In step 1306, the self-station priority control circuit 52 of the base station 30 performs the resource allocation control. Specifically, the self-station priority control circuit 52 temporarily suppresses the use of resources for transmitting non-real time packets, packets of low priority, or real time packets having a margin for Qos within the own cell.

In step 1307, when the peripheral base station interface circuit 53 receives from the mobile station 10 another notification that the Qos of the uplink packet is not ensured, the peripheral base station interface circuit 53 transmits the resource allocation control request to the predetermined peripheral base station 30.

In step 1308, the self-station priority control circuit 52 of the peripheral base station 30 performs the resource allocation control in accordance with the resource allocation control request (especially, regarding urgency) received via the peripheral base station interface circuit 53.

(Operation and Effect of Resource Control System According to this Embodiment)

According to the resource control system of this embodiment, the self-station priority control circuit 52 suppresses the use of resources for packet communication between the base station 30 and the mobile station 10 in accordance with the request from each peripheral base station 30.

Accordingly, each base station can autonomously control the resources, and a station controlling the base stations becomes unnecessary, thus enabling efficient resource control.

According to the resource control system of this embodiment, the resource control of the own cell 1 can be performed in cooperation with the resource control of the peripheral cell 2, thus enabling the improvement of the Qos or the effective use of resources with regard to the entire packet mobile communication system.

As described above, according to the present invention, the resource control of the own cell can be performed in cooperation with the resource control of the peripheral cell, thus enabling the improvement of the Qos or the effective use of resources with regard to the entire packet mobile communication system.

Specifically, the base station of the specific cell temporarily suppresses the use of resources for non-real time packets, packets of low priority, or real time packets having a margin for Qos by the base stations of peripheral cells that tend to affect the base station of the specific cell with interference.

Accordingly, in the above described specific cell, interference from peripheral cells is reduced, and packet discard caused by exceeding the allowable delay time of the transmission of a real time packet or packet discard caused by transmission failure of real time packets is reduced, thus enabling the improvement of the Qos satisfaction and the system capacity.

Especially, in a micro cell with a small cell diameter or a cell for the fourth generation mobile communications, since the mobile stations are often unevenly distributed in each service area, the effect of the improvement is even more remarkable.

According to the present invention, in the case of handover, it is possible to avoid the forced disconnection of real time communication caused by insufficient resources in the cell to which the mobile station moves, thus making it possible to improve Qos in the entire system.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A resource control system in a packet mobile communication environment including a first base station, a second base station and a mobile station, the resource control system controlling resources used for packet communication between the mobile station and each of the first base station and the second base station, the system comprising:
    a judgment unit, provided in the first base station, for judging whether or not the Qos of a packet to be communicated between the first base station and the mobile station is ensured, or judging whether or not the resources necessary for a packet to be communicated between the first base station and the mobile station are secured;
    a second base station interface, provided in the first base station, for requesting the second base station to suppress the use of resources when the Qos of the packet is judged not to be ensured or when the resources necessary for the packet are judged not to be secured; and
    a resource use suppression unit, provided in the second base station, for suppressing the use of resources for packet communication between the mobile station and the second base station in accordance with the request from the first base station.

2. The resource control system according to claim 1, wherein the first base station includes a second base station information request unit for requesting the mobile station for information regarding the second base station when the Qos of the packet is judged not to be ensured or when the resources necessary for the packet are judged not to be secured, and wherein the second base station interface requests the second base station to suppress the use of resources in accordance with received information regarding the second base station, and wherein the mobile station includes a second base station information transmitter for transmitting information regarding the second base station of high interference level to the first base station in accordance with the request from the first base station.

3. The resource control system according to claim 1, wherein the judgment unit judges whether or not the Qos of the packet is ensured by recognizing a traffic type of a packet to be communicated between the first base station and the mobile station and comparing a certain threshold predetermined for each traffic type with the Qos of the packet.

4. The resource control system according to claim 3, wherein the traffic type of the packet is recognized by Diffserv Code Point.

5. The resource control system according to claim 1, wherein the mobile station includes an uplink packet judgment unit for judging whether or not the Qos of the uplink packet is ensured by recognizing the traffic type of an uplink packet directed to the first base station and comparing a certain threshold predetermined for each traffic type with the Qos of the packet, and a notification unit for notifying the first base station that the Qos of the uplink packet is not ensured when the Qos of the uplink packet is judged not to be ensured, and wherein the second base station interface of the first base station requests the second base station to suppress the use of resources in accordance with the notification received from the mobile station.

6. The resource control system according to claim 1, wherein as the Qos of the packet, at least one of a buffer residence time, a delay jitter, an error rate, and a transmission rate of the packet is used.

7. The resource control system according to claim 1, wherein the second base station interface requests the second base station to release the suppression of use of resources when the second base station interface detects that the Qos of the packet is ensured, and wherein the second base station includes a resource use suppression release unit for releasing the suppression of use of resources for packet communication between the mobile station and the second base station in accordance with the request for release from the first base station.

8. A first base station in a packet mobile communication environment including the first base station, a second base station, and a mobile station, the first base station being used in a resource control system for controlling resources used for packet communication between the mobile station and each of the first base station and the second base station, the first base station comprising:
    a judgment unit for judging whether or not Qos of a packet to be communicated between the first base station and the mobile station is ensured, or judging whether or not the resources necessary for a packet to be communicated between the first base station and the mobile station are secured; and
    a second base station interface for requesting the second base station to suppress the use of resources when the Qos of the packet is judged not to be ensured or when the resources necessary for the packet are judged not to be secured.

9. The first base station according to claim 8, further comprising a second base station information request unit for requesting the mobile station for information regarding the second base station when the Qos of the packet is judged not to be ensured or when the resources necessary for the packet are judged not to be secured, wherein the second base station interface requests the second base station to suppress the use of resources in accordance with the information regarding the second base station received from the mobile station.

10. The first base station according to claim 8, wherein the judgment unit judges whether or not the Qos of the packet is ensured by recognizing a traffic type of a packet to be communicated between the first base station and the mobile station, and comparing a certain threshold predetermined for each traffic type with the Qos of the packet.

11. The first base station according to claim 10, wherein the judgment unit recognizes the traffic type of the packet by Diffserv Code Point.

12. The first base station according to claim 8, wherein, when the second base station interface receives a notification from the mobile station that the Qos of an uplink packet directed to the first base station is judged not to be ensured, the second base station interface requests the second base station to suppress the use of resources in accordance with the notification.

13. The first base station according to claim 8, wherein as the Qos of the packet, at least one of a buffer residence time, a delay jitter, an error rate, and a transmission rate of the packet is used.

14. The first base station according to claim 8, wherein, when the second base station interface detects that the Qos of the packet is ensured, the second base station interface requests the second base station to release the suppression of use of resources.

15. A second base station in a packet mobile communication environment including a first base station, the second base station, and a mobile station, the second base station being used in a resource control system for controlling resources used for packet communication between the mobile station and each of the first base station and the second base station, comprising: a resource use suppression unit for suppressing the use of resources for packet communication between the second base station and the mobile station in accordance with a request from the first base station to suppress the use of resources, when Qos of a packet to be communicated between the first base station and the mobile station is judged not to be ensured or when the resources necessary for a packet to be communicated between the first base station and the mobile station are judged not to be secured.

16. The second base station according to claim 15, further comprising a resource use suppression release unit for releasing the suppression of use of resources for packet communication between the second base station and the mobile station in accordance with a request from the first base station to release the suppression of use of resources when the Qos of the packet is detected to be ensured.

17. A method of controlling resources in a packet mobile communication environment including a first base station, a second base station, and a mobile station, the method being used for packet communication between the mobile station and each of the first base station and the second base station, the method comprising the steps of:

A) judging, in the first base station, whether or not Qos of a packet to be communicated between the first base station and the mobile station is ensured, or judging whether or not the resources necessary for a packet to be communicated between the first base station and the mobile station are secured;

B) requesting, in the first base station, the second base station to suppress the use of resources when the Qos of the packet is judged not to be ensured or when the resources necessary for the packet are judged not to be secured; and C) suppressing, in the second base station, the use of resources for packet communication between the second base station and the mobile station in accordance with the request from the first base station.

18. The method of controlling resources according to claim 17, further comprising the steps of:

requesting, in the first base station, the mobile station for information regarding the second base station when Qos of the packet is judged not to be ensured or when the resources necessary for the packet are judged not to be secured; and transmitting, in the mobile station, the information regarding the second base station of a high interference level to the first base station in accordance with a request from the first base station, wherein, in the step B), the second base station is requested to suppress the use of resources in accordance with the received information regarding the second base station.

19. The method of controlling resources according to claim 17, wherein, in the step A), the first base station judges whether or not the Qos of the packet is ensured by recognizing a traffic type of a packet to be communicated between the first base station and the mobile station, and comparing a certain threshold predetermined for each traffic type with the Qos of the packet.

20. The method of controlling resources according to claim 19, wherein, in the step A), the traffic type of the packet is recognized by Diffserv Code Point.

21. The method of controlling resources according to claim 17, further comprising the steps of:

judging, in the mobile station, whether or not the Qos of an uplink packet is ensured by recognizing a traffic type of the uplink packet directed to the first base station, and comparing a certain threshold predetermined for each traffic type with the Qos of the packet, and notifying, in the mobile station, the first base station that the Qos of the uplink packet is not ensured when the Qos of the uplink packet is judged not to be ensured, wherein in the step B), the first base station requests the second base station to suppress the use of resources in accordance with the notification received from the mobile station.

22. The method of controlling resources according to claim 17, wherein as the Qos of the packet, at least one of a buffer residence time, a delay jitter, an error rate, and a transmission rate of the packet is used.

23. The method of controlling resources according to claim 17, further comprising the steps of:

requesting, in the first base station, the second base station to release the suppression of use of resources when the Qos of the packet is detected to be ensured; and releasing, in the second base station, the suppression of use of resources for the packet communication between the second base station and the mobile station in accordance with the request for release from the first base station.

* * * * *